United States Patent
Dileo et al.

(10) Patent No.: US 9,093,676 B2
(45) Date of Patent: Jul. 28, 2015

(54) APPARATUS AND METHOD OF IN-SITU MEASUREMENT OF MEMBRANE FLUID CROSSOVER

(71) Applicant: Nissan North America, Inc., Franklin, TN (US)

(72) Inventors: Gregory Dileo, Ann Arbor, MI (US); Rameshwar Yadav, Farmington, MI (US)

(73) Assignee: Nissan North America, Inc., Franklin, TN (US)

( * ) Notice: Subject to any disclaimer, the term of this patent is extended or adjusted under 35 U.S.C. 154(b) by 344 days.

(21) Appl. No.: 13/663,177

(22) Filed: Oct. 29, 2012

(65) Prior Publication Data
US 2014/0120442 A1    May 1, 2014

(51) Int. Cl.
*H01M 8/04* (2006.01)
*H01M 8/10* (2006.01)

(52) U.S. Cl.
CPC ........ *H01M 8/04462* (2013.01); *H01M 8/0447* (2013.01); *H01M 8/04679* (2013.01); *H01M 8/04164* (2013.01); *H01M 2008/1095* (2013.01); *Y02E 60/50* (2013.01)

(58) Field of Classification Search
CPC .. H01M 8/04; H01M 8/04462; H01M 8/0447
See application file for complete search history.

(56) References Cited

U.S. PATENT DOCUMENTS

| | | |
|---|---|---|
| 6,777,116 B1 | 8/2004 | Muller et al. |
| 8,053,131 B2 | 11/2011 | Son et al. |
| 2004/0104342 A1* | 6/2004 | Yamada et al. ............... 250/288 |
| 2005/0233182 A1* | 10/2005 | Fuss et al. ...................... 429/12 |
| 2007/0292735 A1* | 12/2007 | McMahon ...................... 429/33 |
| 2008/0001313 A1 | 1/2008 | Zhang et al. |
| 2008/0050619 A1* | 2/2008 | Lai ................................. 429/13 |
| 2009/0311576 A1 | 12/2009 | Na et al. |

OTHER PUBLICATIONS

Dr. Kevin. R. Cooper, in Situ PEMFC Fuel Crossover & Electrical Short Circuit Measurement, Aug./Sep. 2008, p. 1.*
University of Pittsburgh, Mass Spectrometry Introduction, Jan. 11, 2012 p. 3.*
V. I. Basura, P.D. Beattie, and S. Holdcroft, Solid-state electrochemical oxygen reduction at Pt-Nafion 117 and Pt-BAM3G 407 interfaces, J. Electroanalytical Chemistry, 458 (1998), 1-5.
P.D. Beattie, V. I. Basura, and S. Holdcroft, Temperature and pressure dependence of O2 reduction at Pt-Nafion 117 and Pt-BAM 407 interfaces, J. Electroanalytical Chemistry, 468 (1999), 180-192.

(Continued)

*Primary Examiner* — Miriam Stagg
*Assistant Examiner* — Seenam Agbetiafan
(74) *Attorney, Agent, or Firm* — Young, Basile, Hanlon & MacFarlane, P.C.

(57) ABSTRACT

Systems and methods for measuring in-situ membrane fluid crossover are provided. One embodiment of a system for diagnosing in situ degradation of membranes in a fuel cell stack comprises an inert gas supply configured to be connected to the fuel cell stack to supply an inert gas to an anode side of the fuel cell stack during diagnosis and an analyzer, for example, for detecting an amount of crossover cathode gas in exhaust from the anode side of the fuel cell stack during diagnosis.

8 Claims, 8 Drawing Sheets

(56) References Cited

OTHER PUBLICATIONS

P. Gode, G. Lindbergh, and G. Sundholm, In-situ measurements of gas permeability in fuel cell membranes using a cylindrical microelectrodes, J. Electroanalytical Chemistry, 518 (2002) 115-122.

Cooper, Kevin R., "In Situ PEMFC Fuel Crossover & Electrical Short Circuit Measurement", Fuel Cell Magazine, Aug./Sep. 2008, 2 pp.

* cited by examiner

APPARATUS AND METHOD OF IN-SITU MEASUREMENT OF MEMBRANE FLUID CROSSOVER

TECHNICAL FIELD

The invention relates to the field of devices and methods for measuring fuel cell performance, and in particular to measuring membrane degradation of a fuel cell in-situ.

BACKGROUND

Fuel cells efficiently and electrochemically convert fuel into electric current, which may then be used to power electric circuits, such as drive systems for vehicles. A fuel cell containing a proton exchange membrane is an electrochemical device that converts chemical energy to electrical energy using, for example, hydrogen or methane as fuel and oxygen/air as oxidant. A typical proton exchange membrane fuel cell is generally composed of five layers that form a fuel cell membrane electrode assembly. The membrane electrode assembly includes a solid polymer electrolyte proton conducting membrane, two gas diffusion layers, and two catalyst layers.

During operation of the fuel cell, crossover from the cathode to the anode or the anode to the cathode can occur through the membrane. This crossover of the cathode fluid, for example, can create reactions at the anode, generating a mixed potential at the anode, leading to a loss of voltage, power and efficiency. The fluid can also chemically react to form free-radicals in the membrane which degrades the membrane, increasing the potential for further crossover.

SUMMARY

Disclosed herein are assemblies and methods for measuring in-situ membrane fluid crossover. One embodiment of an in-situ fuel cell membrane crossover measurement assembly as disclosed herein comprises an anode fluid supply configured to supply anode fluid to an anode side of a proton exchange membrane; a cathode fluid supply configured to supply cathode fluid to a cathode side of the proton exchange membrane; a collection chamber configured to receive an exhaust from one of the anode side and the cathode side of the proton exchange membrane; and means for detecting a crossover fluid in the exhaust. The crossover fluid is from the cathode fluid if the exhaust is collected from the anode side and the crossover fluid is from the anode fluid if the exhaust is collected from the cathode side.

Another embodiment of an in-situ fuel cell membrane oxygen crossover measurement assembly as disclosed herein comprises an inert gas supply configured to supply inert gas to an anode side of a proton exchange membrane; a gas supply comprising oxygen configured to supply an oxygen source to a cathode side of the proton exchange membrane; a collection chamber configured to receive an anode exhaust from the anode side of the proton exchange membrane, collect condensed liquid from the anode exhaust and release dewatered anode exhaust; and means for detecting oxygen in the dewatered anode exhaust from the collection chamber.

A method of measuring fluid crossover in a fuel cell in-situ as disclosed herein comprises supplying an anode fluid to an anode side of a proton exchange membrane; supplying a cathode fluid to a cathode side of the proton exchange membrane; supplying exhaust from one of the anode side and the cathode side of the proton exchange membrane to a collection chamber; and measuring a crossover fluid with a crossover fluid detector. The crossover fluid is from the cathode fluid if the exhaust is collected from the anode side and the crossover fluid is from the anode fluid if the exhaust is collected from the cathode side.

Also disclosed herein are systems and methods for diagnosing in situ degradation of membranes in a fuel cell stack. One embodiment of a system comprises an inert gas supply configured to be connected to the fuel cell stack to supply an inert gas to an anode side of the fuel cell stack during diagnosis and means for detecting an amount of crossover cathode gas in exhaust from the anode side of the fuel cell stack during diagnosis.

A method of in situ measuring of membrane degradation in a fuel cell stack as disclosed herein comprises ceasing a fuel gas supply to an anode of a fuel cell stack; connecting an inert gas supply to an anode inlet of the fuel cell stack; operating a gas flow system of the fuel cell stack, including flowing inert gas to the anode and a cathode gas through a cathode; and measuring an amount of cross-over cathode gas in an anode exhaust of the fuel cell stack.

BRIEF DESCRIPTION OF THE DRAWINGS

The various features, advantages and other uses of the present apparatus will become more apparent by referring to the following detailed description and drawing in which.

DETAILED DESCRIPTION

Disclosed herein are assemblies and methods that test in-situ fuel cell proton exchange membrane degradation in a laboratory setting and during operation of the fuel cell.

Figure 1:
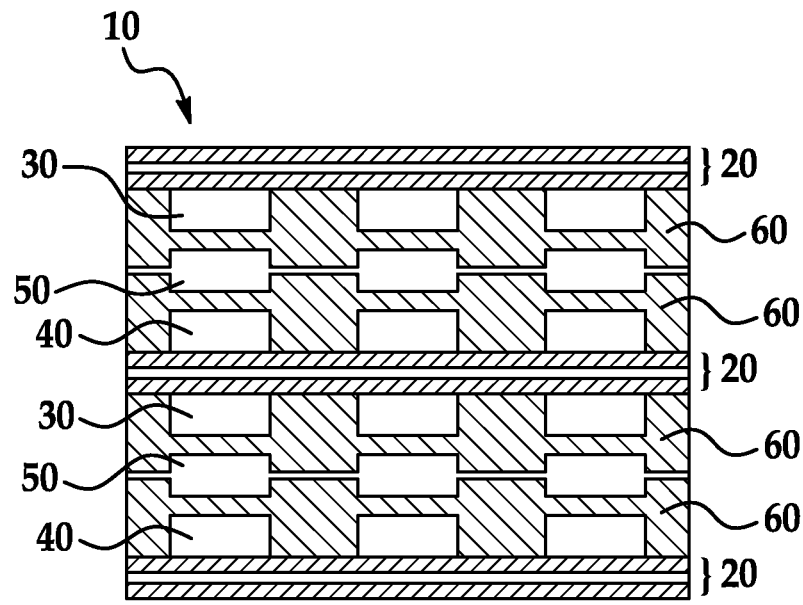
FIG. 1 is a schematic cross-sectional illustration of a basic fuel cell stack having multiple gas diffusion electrodes.

Proton exchange membrane fuel cells (PEMFCs) are electrochemical devices converting chemical energy to an electrical energy by using hydrogen or methanol as a fuel and oxygen/air as an oxidant. The proton exchange membrane fuel cell generally comprises five layers to form a fuel cell membrane electrode assembly, including a solid polymer electrolyte proton conducting membrane, two gas diffusion layers, and two catalyst layers. FIG. 1 shows a schematic cross-sectional illustration of a portion of a fuel cell stack 10. The illustration is provided as an example of the use of a proton exchange membrane, also referred to herein as membrane, in fuel cells and is not meant to be limiting.

The fuel cell stack 10 is comprised of multiple membrane electrode assemblies 20. Fuel 30 such as hydrogen is fed to the anode side of a membrane electrode assembly 20, while an oxidant 40 such as oxygen or air is fed to the cathode side of the membrane electrode assembly 20. Coolant 50 is supplied between the fuel 30 and oxidant 40, the coolant 50 separated from the fuel 30 and oxidant 40 by separators 60.

Figure 2:
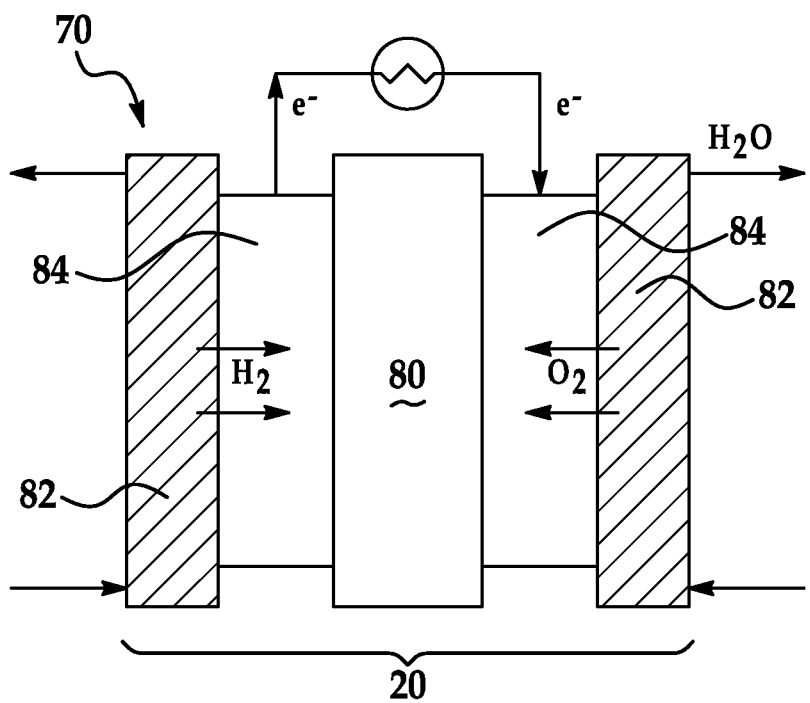
FIG. 2 is an enlarged schematic cross-sectional view of a membrane electrode assembly from the fuel cell stack of FIG. 1.

FIG. 2 is an illustration of one of the plurality of fuel cells 70 in the fuel cell stack 10. The fuel cell 70 is comprised of a single membrane electrode assembly 20. The membrane electrode assembly 20 has a catalyst coated membrane 80 with a gas diffusion layer 82 on opposing sides of the membrane 80. The membrane 80 has a catalyst layer 84 formed on opposing surfaces of the membrane 80, such that when assembled, the catalyst layers are each between the membrane 80 and a gas diffusion layer 82. Alternatively, a gas diffusion electrode is made by forming one catalyst layer 84 on a surface of two gas diffusion layers 82 and sandwiching the membrane 80 between the gas diffusion layers 82 such that the catalyst layers 84 contact the membrane 80. When fuel 30, such as hydrogen gas, is introduced into the fuel cell 70, the catalyst layer 84 of the catalyst coated membrane 80 splits hydrogen gas molecules into protons and electrons. The protons pass through the membrane 80 to react with the oxidant 40, such as air, forming water ($H_2O$). The electrons ($e^-$), which cannot pass through the membrane 80, must travel around it, thus creating the source of electrical energy.

During operation of the fuel cell, it is possible for the oxidant or the fuel to cross over the membrane in small quantities. For example, oxygen may cross over from the cathode to the anode in a hydrogen fuel cell. The crossover oxygen reacts with hydrogen at the anode and generates a mixed potential at the anode leading to a loss of voltage, power and efficiency. In addition, the crossover oxygen can chemically react to form free-radicals such as hydrogen peroxide in the membrane by combining with hydrogen that has crossed over. These free-radicals degrade the membrane, which is typically made of polymer. The degradation further results in increased cross over, which in turn leads to a greater loss of voltage, power and efficiency.

To reduce the cost of fuel cells and to decrease environmental impact, much effort is being made to increase the performance and durability of membrane electrode assemblies such as those described with reference to FIGS. 1 and 2. As noted, the condition of the membrane plays an important factor in the performance and durability of the membrane electrode assembly in the fuel cell. The assemblies and methods herein provide measurement of in-situ membrane crossover in order to characterize, rank, benchmark and select appropriate membranes to optimize the performance and durability of membrane electrode assemblies. The assemblies and methods herein also provide for in-situ measuring of membrane degradation based on membrane crossover to prevent major failures of fuel cells during operation. As a non-limiting example, in lithium-air batteries, oxygen crossover from cathode to anode is hazardous. The assemblies and methods herein can be used to monitor these batteries so that operation can be stopped when crossover is detected.

Figure 3:
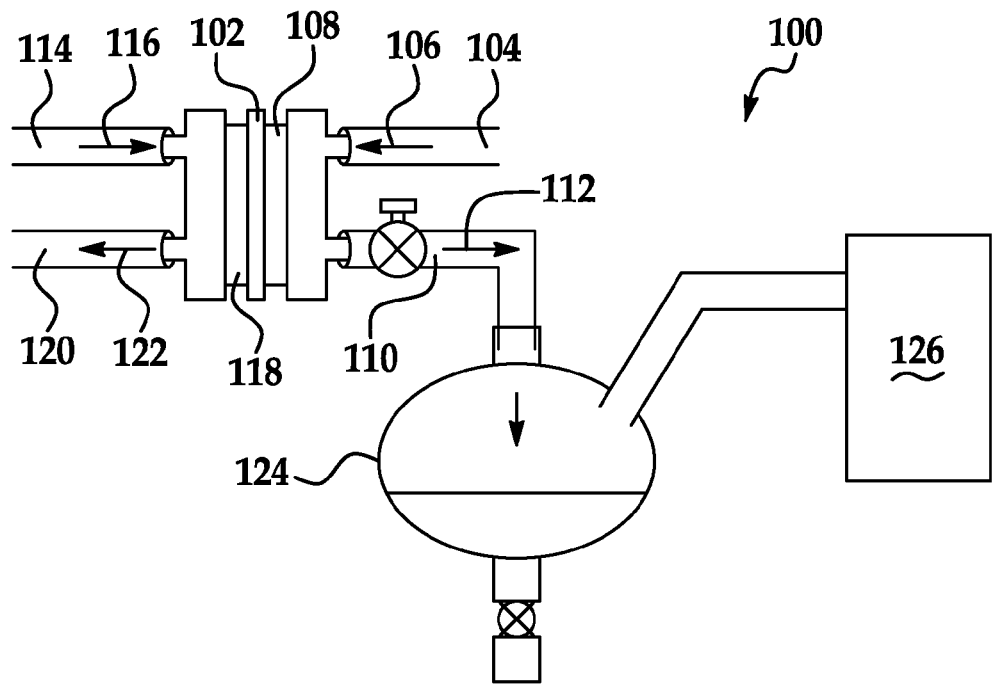
FIG. 3 is a schematic of an embodiment of a membrane crossover measurement assembly as disclosed herein.

FIG. 3 illustrates one embodiment of an in-situ fuel cell membrane crossover measurement assembly 100. A proton exchange membrane 102 is provided. Because catalyst is not required for the measurement, the membrane 102 can be in a fuel cell, in a membrane electrode assembly, or in an assembly that provides for fluids to be fed to either side of the membrane. An anode fluid supply 104 is configured to supply anode fluid 106 to an anode side 108 of the proton exchange membrane 102. An anode exhaust line 110 is configured to carry anode exhaust 112 from the anode side 108 of the membrane 102. A cathode fluid supply 114 is configured to supply cathode fluid 116 to a cathode side 118 of the proton exchange membrane 102. A cathode exhaust line 120 is configured to carry cathode exhaust 122 from the cathode side 118 of the membrane 102. A collection chamber 124 is configured to receive one of the anode exhaust 112 or the cathode exhaust 122 from the respective anode side 108 or cathode side 118 of the proton exchange membrane 102. Means 126 for detecting a crossover fluid in the anode or cathode exhaust 112, 122 is configured to detect the crossover fluid within the collection chamber 124 or received from the collection chamber 124.

The crossover fluid is from the cathode fluid 116 if the exhaust collected is anode exhaust 112 from the anode side 108, while the crossover fluid is from the anode fluid 106 if the exhaust collected is cathode exhaust 122 from the cathode side 118. The former is illustrated in FIG. 3. The following are provided as non-limiting examples of anode fluid 106, cathode fluid 116 and crossover fluid as used with the assembly 100.

The anode fluid 106 supplied to the anode side 108 of the membrane 102 can be methanol, with the cathode fluid 116 being a source of oxygen such as oxygen gas or air. The collection chamber 124 can receive anode exhaust 112 from the anode side 108 and the means 126 for detecting a crossover fluid can be configured to detect oxygen in the anode exhaust 112 that has crossed over the membrane 102 from the cathode fluid 116 on the cathode side 118.

The anode fluid 106 supplied to the anode side 108 of the membrane 102 can be methanol, with the cathode fluid 116 being a source of oxygen such as oxygen gas or air. The collection chamber 124 can receive cathode exhaust 122 from the cathode side 118 and the means 126 for detecting a crossover fluid can be configured to detect methanol in the cathode exhaust 122 that has crossed over the membrane 102 from the anode fluid 106 on the anode side 108.

The anode fluid 106 supplied to the anode side 108 of the membrane 102 can be hydrogen, with the cathode fluid 116 being a source of oxygen such as oxygen gas or air. The collection chamber 124 can receive cathode exhaust 122 from the cathode side 118 and the means 126 for detecting a crossover fluid can be configured to detect hydrogen in the cathode exhaust 122 that has crossed over the membrane 102 from the anode fluid 106 on the anode side 108.

Figure 4:
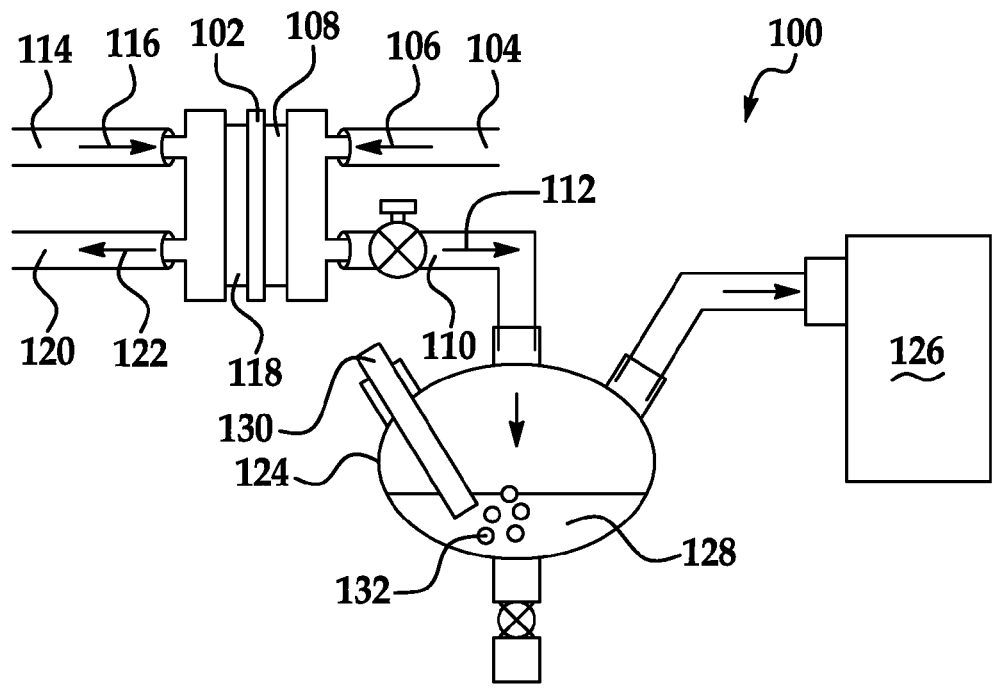
FIG. 4 is a schematic of an aspect of the embodiment of the membrane crossover measurement assembly as disclosed herein.

As shown in FIG. 4, if the anode or cathode exhaust 112, 122 is a gas, the collection chamber 124 can be configured to collect condensed liquid 128 from the exhaust gas to at least partially dry the gas before reaching the means 126 for detecting. Also shown in FIG. 4, the assembly 100 can further comprise a sparger 130 for bubbling an inert gas 132 into the condensed liquid 128 collected in the collection chamber 124 to remove dissolved gas in the condensed liquid 128, increasing the accuracy of the cross-over fluid measurement.

Figure 5:
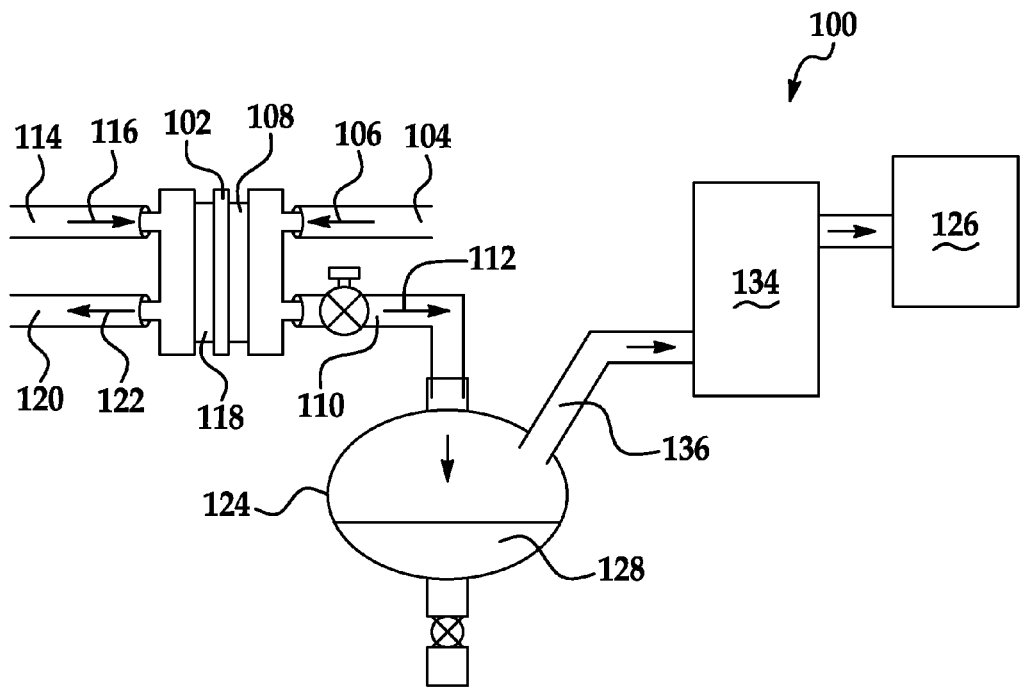
FIG. 5 is a schematic of another aspect of the embodiment of the membrane crossover measurement assembly as disclosed herein.

The assembly 100 can comprise a gas drying unit 134, as shown in FIG. 5, if the anode or cathode exhaust 112, 122 to be analyzed is a gas. The gas drying unit 134 can receive the dewatered exhaust gas 136 from the collection chamber 124 and further dry the dewatered exhaust gas 136 prior to reaching the means 126 for detecting the crossover fluid.

Figure 6:
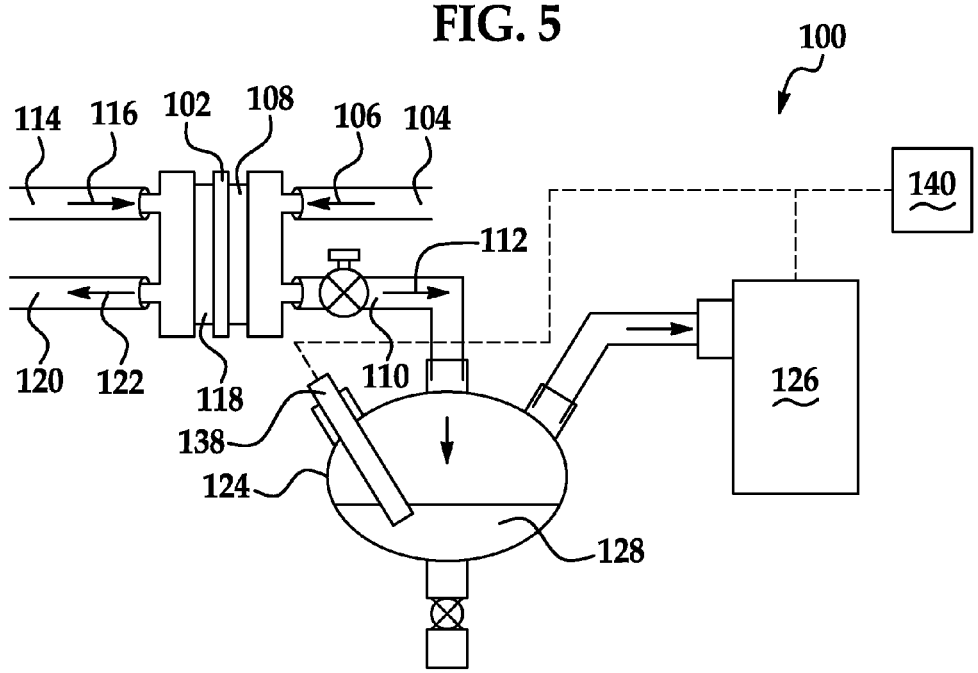
FIG. 6 is a schematic of yet another aspect of the embodiment of the membrane crossover measurement assembly as disclosed herein.

The assembly 100 can comprise a meter 138 to measure dissolved gas or conductivity in the collection chamber 124 configured to measure dissolved gas in the condensed liquid 128 collected in the collection chamber 124, as illustrated in FIG. 6. The measurement taken with the meter 138 can be combined with the measurement taken with the means 126 for detecting to obtain a more accurate amount of crossover fluid in the exhaust being measured.

The means 126 for detecting the crossover fluid used with any of the embodiments disclosed herein can be a trace gas analyzer, a mass spectrometer, a gas chromatograph or any other device known to those skilled in the art to measure a component or element in a fluid.

The assembly 100 and any variations thereof can include a data logger configured to log data from the means 126 for detecting the crossover fluid. The data can be stored in a memory device 140 as shown in FIG. 6. A display can be incorporated into the assembly 100 to display the results of the means 126 for detecting and, if used, the meter 138.

Figure 7:
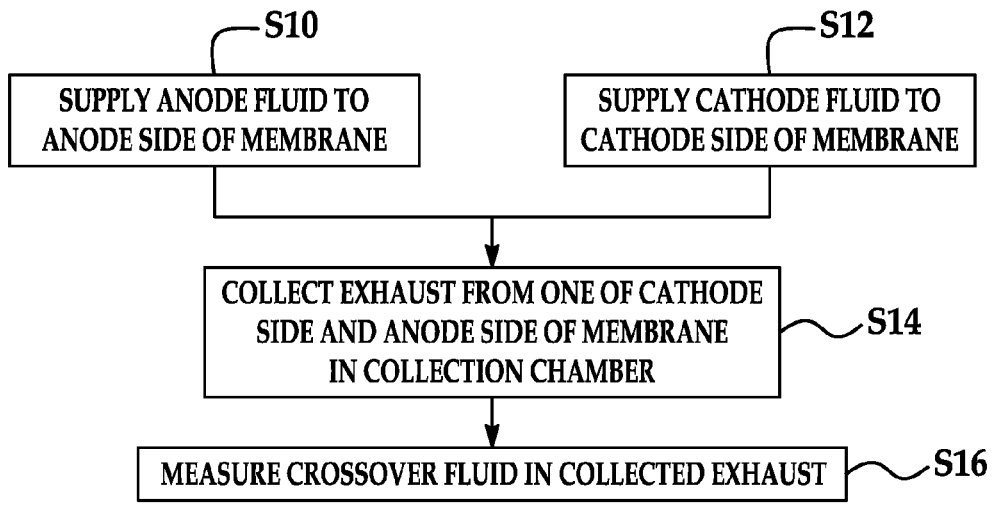
FIG. 7 is a flow diagram of a method of measuring in-situ fluid crossover of a membrane.

A method of measuring fluid crossover in a fuel cell in-situ is diagramed in FIG. 7. The method comprises supplying an anode fluid to an anode side of a proton exchange membrane in S10. A cathode fluid is supplied to a cathode side of the proton exchange membrane in S12. Exhaust from one of the anode side and the cathode side of the proton exchange membrane is supplied to a collection chamber in S14. A crossover fluid is measured in the exhaust with a crossover fluid detector in S16. The crossover fluid is from the cathode fluid if the exhaust is collected from the anode side and the crossover fluid is from the anode fluid if the exhaust is collected from the cathode side.

Figure 8:
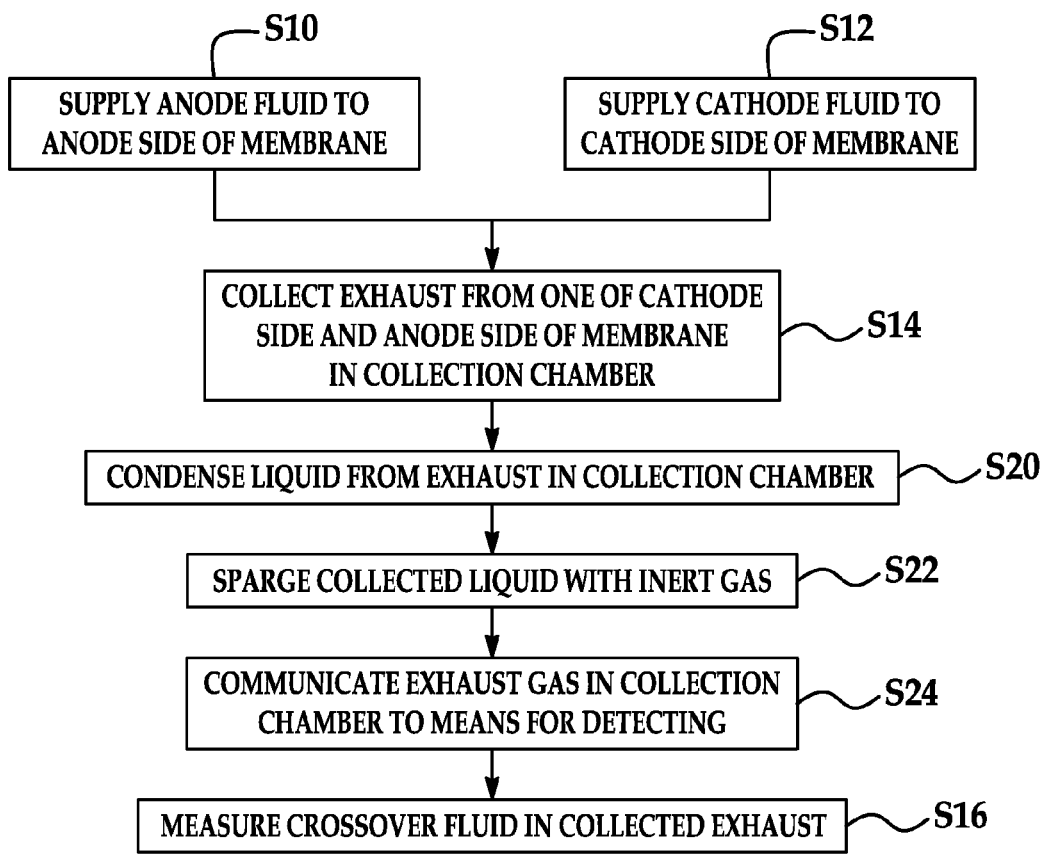
FIG. 8 is a flow diagram of an aspect of the method of measuring in-situ fluid crossover of a membrane.

As shown in FIG. 8, when the exhaust is an exhaust gas, the method can further comprise condensing liquid from the exhaust gas in the collection chamber in S20. This condensed liquid can be sparged with an inert gas to remove dissolved gas from the liquid in S22. The exhaust gas from the collection chamber, which includes any sparged dissolved gas, is communicated to the gas detector in S24 for measurement of the crossover fluid. The exhaust gas communicated to the gas detector can be further dried with a gas drying unit prior to reaching the gas detector as desired or required.

The relative humidity of one or both of the anode fluid and the cathode fluid can be adjusted prior to supplying the anode fluid and cathode fluid if either of the anode fluid and the cathode fluid is a gas. Similarly, the temperature of one or both of the anode fluid and the cathode fluid prior to supplying the anode fluid and cathode fluid.

In use, with any assembly 100 and method disclosed herein, an inert gas can be fed through both the anode side 108 and cathode side 118 to remove trace gases from the system. The means 126 for detecting is monitored while the system is operating with the inert gas and a stabilized value of crossover fluid is taken as a baseline reading. The anode fluid 106 and cathode fluid 116 can then be introduced. The flow rate of the anode fluid 106 and cathode fluid 116 can be controlled, as well as the pressure, temperature and relative humidity of the anode and cathode fluids 106, 116. As each of these parameters, and in particular the temperature and relative humidity, affect the performance of the fuel cell, tests on membrane degradation can be performed under different temperature profiles and different relative humidity profiles. The testing can be performed until a stabilized value of crossover fluid is detected, with the stabilized value equating to an amount of membrane degradation. The greater the stabilized value, the greater the amount of degradation that has occurred to the membrane being tested. Testing can also be performed over a period of time with the amount of crossover fluid detected being tracked over the period of time.

Figure 9:
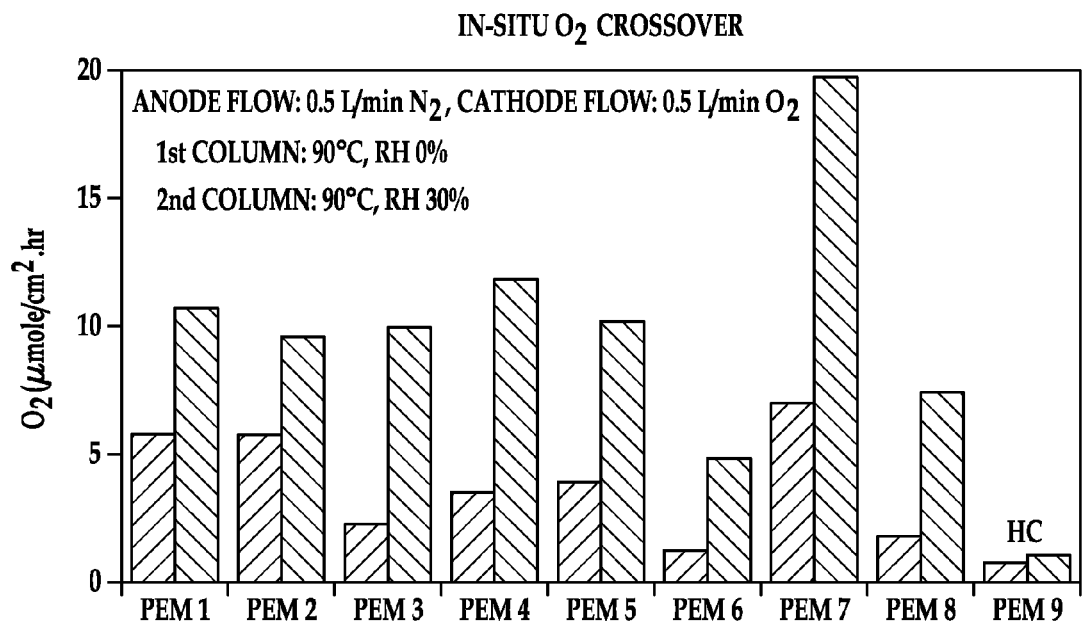
FIG. 9 is a graph of results using the embodiment of the membrane crossover measurement assembly disclosed herein.

FIG. 9 is a graph showing the amount of oxygen crossover across various membranes at two different levels of relative humidity. The measurements were completed using the assembly 100 disclosed herein. As seen in the legend of FIG. 9, various thicknesses and types (polymer versus hydrocarbon) of membranes were tested. It should be noted that the assembly 100 disclosed herein is capable of detecting a wide range of fluid crossover, including the extremely low oxygen crossover that is inherent with hydrocarbon membranes.

With some modification, the apparatus and methods disclosed can be used as a diagnostic tool during service of a fuel cell stack, for example. Early detection of membrane degradation can initiate fuel cell stack maintenance that will maintain the efficiency of the fuel cell stack. Early detection can also prevent a failure of the fuel cell stack system.

Figure 10:
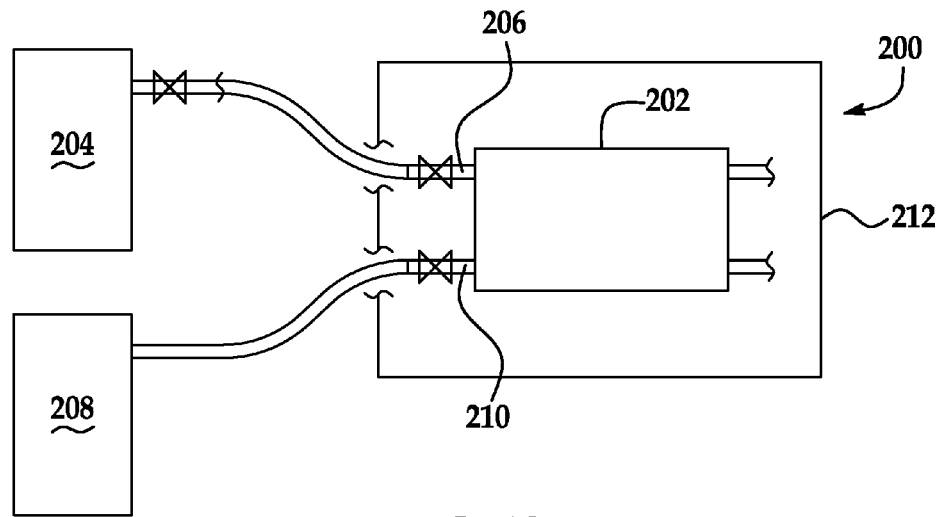
FIG. 10 is a schematic of a system for diagnosing membrane degradation of a fuel cell stack as disclosed herein.

A system 200 for diagnosing in situ degradation of membranes in a fuel cell stack 202 as illustrated in FIG. 10 has an inert gas supply 204 configured to be connected to the fuel cell stack 202 to supply an inert gas to an anode side 206 of the fuel cell stack during diagnosis and means 208 for detecting an amount of crossover cathode gas in exhaust 210 from the anode side 206 of the fuel cell stack 202 during diagnosis while the fuel cell stack is in the vehicle 212.

The system 200 can be provided in a vehicle maintenance facility with the diagnosis incorporated into the vehicle's 212 scheduled services or performed when troubleshooting the fuel cell stack 202 operation. The means 208 for detecting the amount of crossover cathode gas used with any of the embodiments disclosed herein can be a trace gas analyzer, a mass spectrometer, a gas chromatograph or any other device known to those skilled in the art to measure a component or element in a fluid.

Figure 11:
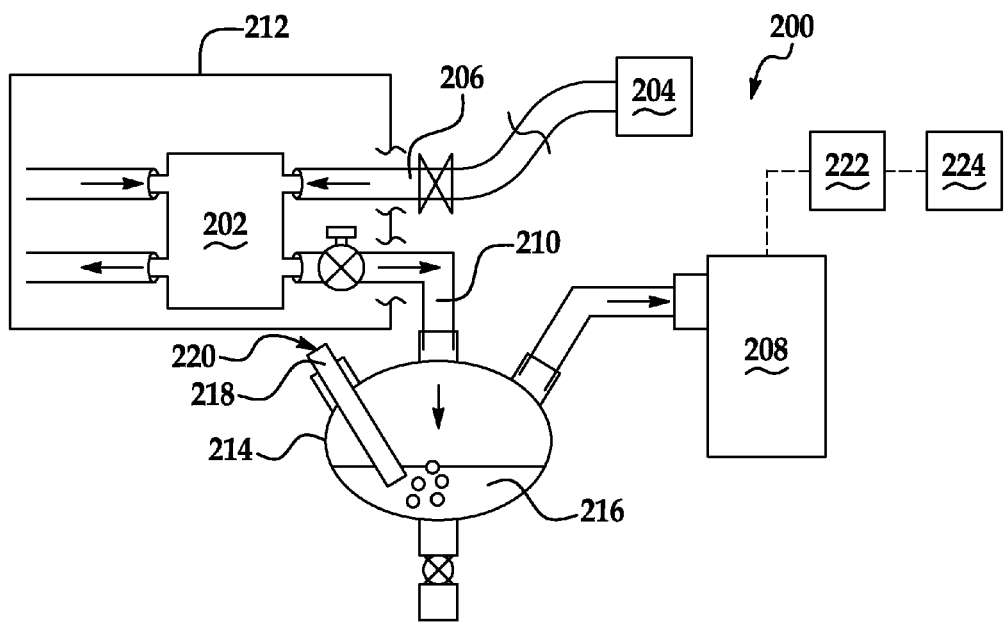
FIG. 11 is a schematic of an aspect of the system for diagnosing membrane degradation of a fuel cell stack as disclosed herein.

The system 200 can include any of the assemblies 100 described herein. For example, as shown in FIG. 11, a collection chamber 214 can be configured to collect condensed liquid 216 from the exhaust 210 to at least partially dry the gas before reaching the means 208 for detecting. Also shown in FIG. 11, the system 200 can further comprise a sparger 218 for bubbling an inert gas 220 into the condensed liquid 216 collected in the collection chamber 214 to remove dissolved gas in the condensed liquid 216, increasing the accuracy of the crossover cathode gas measurement.

The system 200 can comprise a gas drying unit 134, such as that shown in FIG. 5, configured to receive the dewatered exhaust 210 from the collection chamber 214 and further dry the dewatered exhaust 210 prior to reaching the means 208 for detecting the crossover cathode gas.

The system 200 can also comprise a meter 138 as shown in FIG. 6, to measure dissolved gas or conductivity in the collection chamber 214 configured to measure dissolved crossover cathode gas in the condensed liquid 216 collected in the collection chamber 214. The measurement taken with the meter 138 can be combined with the measurement taken with the means 208 for detecting to obtain a more accurate amount of crossover cathode gas in the anode exhaust.

The system 200 and any variations thereof can include a data logger configured to log data from the means 208 for detecting the crossover cathode gas. The data can be stored in a memory device 222 as shown in FIG. 11. A display can be incorporated into the system 200 to display the results of the means 208 for detecting and, if used, the meter 138.

Figure 12:
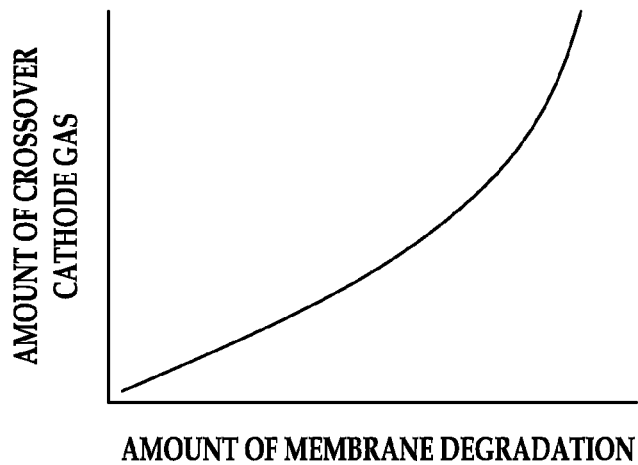
FIG. 12 is a graph representing the amount of membrane degradation based on the amount of crossover cathode gas detected.

The system 200 can have a control unit 224 having preprogrammed baseline data relating an amount of crossover cathode gas to an amount of membrane degradation, illustrated in FIG. 12. The control unit 224 can be the same unit as the memory device 222 or can be another unit as desired. The control unit 224 is configured to receive data from the means 208 for detecting the crossover cathode gas and to compare the data to the preprogrammed baseline data to determine membrane degradation.

Figure 13:
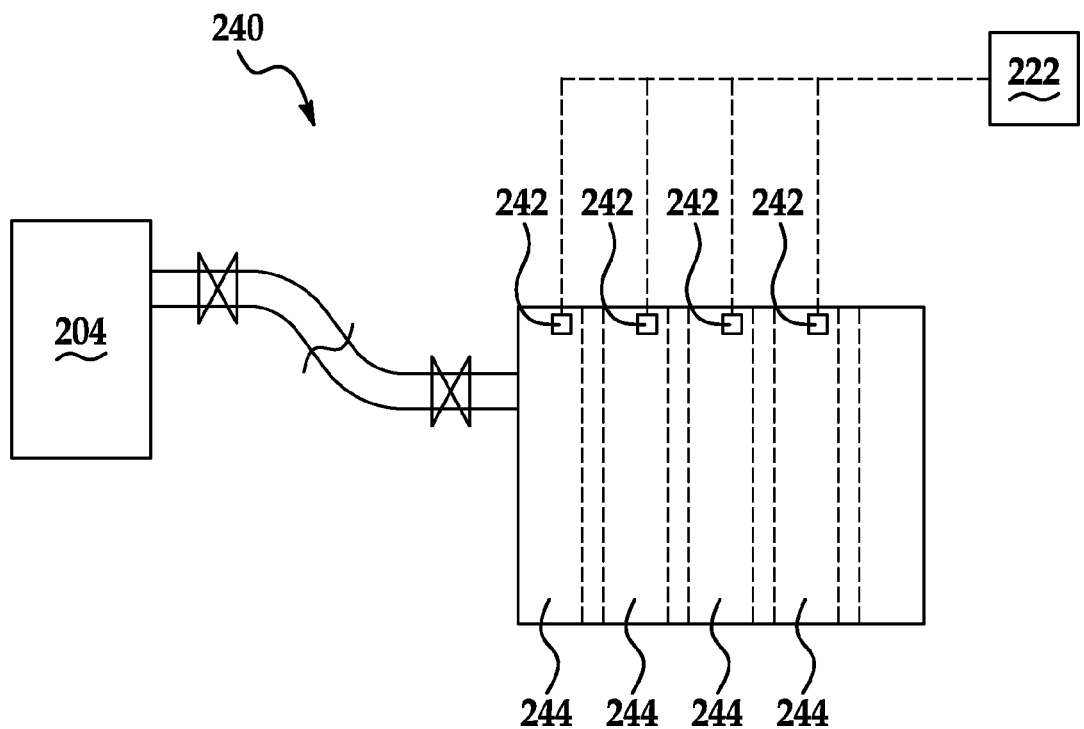
FIG. 13 is another embodiment of a system for diagnosing membrane degradation of a fuel cell stack as disclosed herein.

As illustrated in FIG. 13, another embodiment of the system 240 can comprise a plurality of oxygen sensors 242, each oxygen sensor 242 located on a respective anode 244 of a fuel cell within the fuel cell stack 202 to detect an amount of crossover cathode gas in exhaust from the respective anode 244. The system 240 also has a control unit 224 having preprogrammed baseline data relating the amount of crossover cathode gas to the amount of membrane degradation. The control unit 224 is configured to receive data from each of the oxygen detectors 242 and to compare the data to the preprogrammed baseline data to determine membrane degradation. The system can also comprise the memory unit 222 and a display as desired or required.

Figure 14:
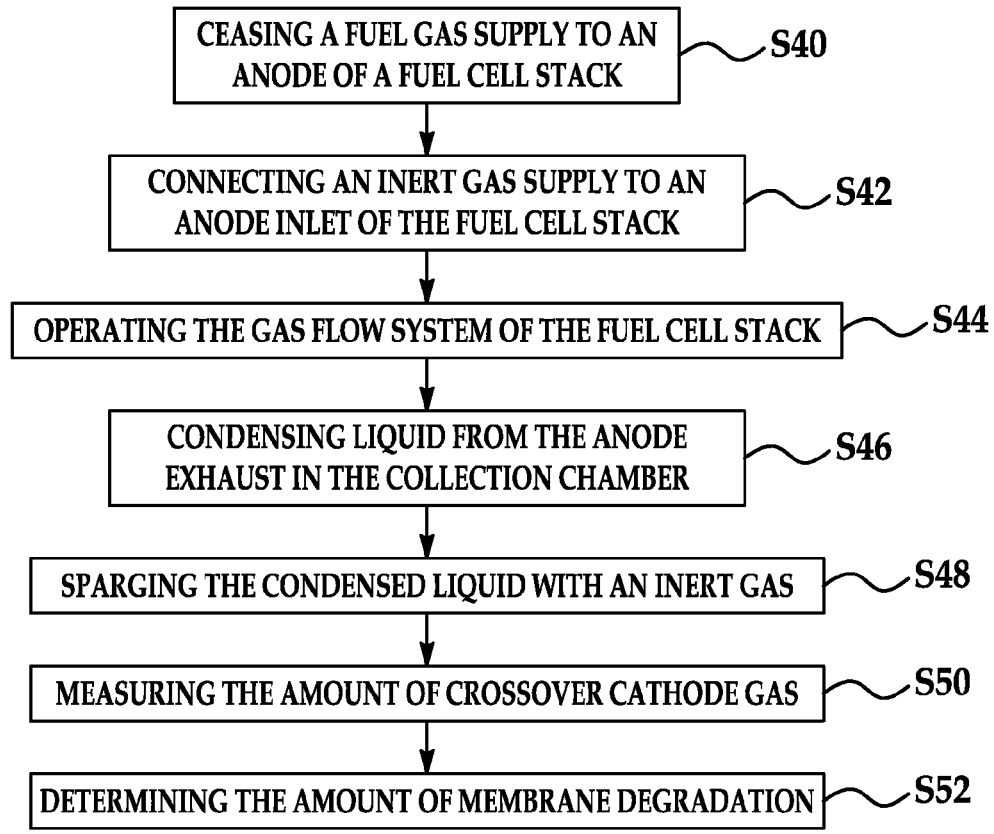
FIG. 14 is a flow diagram of a method of diagnosing membrane degradation of a fuel cell stack as disclosed herein.

FIG. 14 is a flow chart of a method in situ measuring of membrane degradation in a fuel cell stack of a vehicle utilizing any one of the systems disclosed herein. The method comprises first ceasing a fuel gas supply to an anode of a fuel cell stack in S40 and connecting an inert gas supply to an anode inlet of the fuel cell stack in S42. When a vehicle is brought to the service facility, the fuel gas supply, such as a hydrogen supply, is ceased and the inert gas supply is either connected to the fuel gas supply or supplied with its own connection on the fuel cell stack. The fuel cell stack is purged with the inert gas, such as nitrogen, to remove any trace of the fuel gas.

When the fuel cell stack is purged of fuel, the gas flow system of the fuel cell stack is operated with the cathode gas, typically an oxidant such as air or oxygen, supplied to the cathode side and the inert gas supplied to the anode side in S44. The amount of crossover cathode gas is measured in the anode exhaust of the fuel cell stack in S50.

The method can further comprise condensing liquid from the anode exhaust in the collection chamber in S46. This condensed liquid can be sparged with an inert gas to remove dissolved crossover cathode gas from the liquid in S48. The exhaust gas from the collection chamber, which includes any sparged dissolved gas, is communicated to the means for detecting, with the crossover cathode gas measured in S50. The anode exhaust communicated to the means for detecting can be further dried with a gas drying unit prior to reaching the means for detecting as desired or required.

The method can also include measuring a dissolved gas or conductivity of the condensed liquid in the collection cell to obtain a more accurate measurement of crossover cathode gas.

The relative humidity of one or both of the inert gas and the cathode gas can be adjusted to better simulate operation of the fuel cell stack. Similarly, the temperature of one or both of the inert gas and the cathode gas can be adjusted. Flow rates and pressures of the inert gas and cathode gas can also be controlled.

The means for detecting is monitored while the system is operating with the inert gas and a stabilized value of crossover cathode gas can be taken as a baseline reading. The cathode gas can then be introduced. The testing can be performed until a stabilized value of crossover cathode gas is detected. In S52 the amount of membrane degradation is determined by comparing the amount of crossover cathode gas measured, for example the stabilized value, with the preprogrammed baseline data relating the amount of crossover cathode gas to the amount of membrane degradation. The greater the stabilized value, the greater the amount of degradation that has occurred to the membranes of the fuel cell stack being diagnosed.

Figure 15:
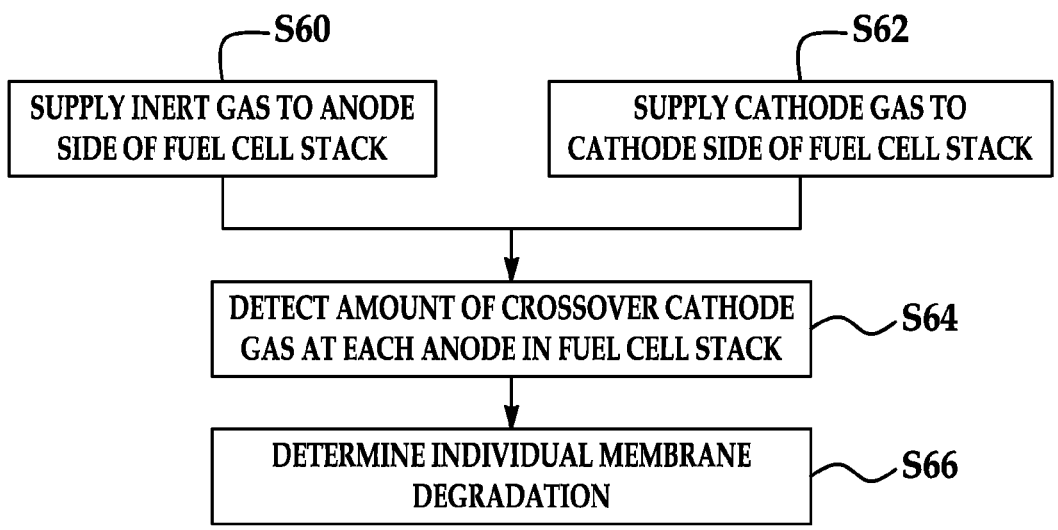
FIG. 15 is a flow diagram of another method of diagnosing membrane degradation of a fuel cell stack as disclosed herein.

This method diagnoses total crossover cathode gas across all of the cells in the fuel cell stack. However, the method of diagnosing membrane degradation shown in FIG. 15 diagnoses the degradation of each individual membrane in the fuel cell stack, as well as the total crossover cathode gas. After the fuel cell stack has been purged, inert gas is supplied to the anode side of the fuel cell stack in S60 and cathode gas is supplied to the cathode side of the fuel cell stack in S62. The amount of crossover cathode gas is detected in an exhaust from a plurality of anodes in the fuel cell stack with a plurality of individual gas detectors in S64. The gas detectors, for example, oxygen detectors, can be installed during manufacture or can be installed post manufacture. In S66, the amount of individual membrane degradation is determined by comparing the amount of crossover cathode gas measured by each of the individual gas detectors with preprogrammed baseline data relating the amount of cathode gas crossover to the amount of membrane degradation.

It is also contemplated herein that, rather than individual gas detectors at each anode in the fuel cell stack, a small sample of anode exhaust from each anode can be collected via sample ports, with each sample communicated to the means for detecting the crossover cathode gas for testing.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A system for diagnosing in situ degradation of membranes in a fuel cell stack comprising:
   an inert gas supply configured to be connected to the fuel cell stack to supply an inert gas to an anode side of the fuel cell stack during diagnosis;
   a collection cell configured to receive an exhaust from the anode side of the fuel cell stack, collect condensed liquid from the exhaust and release dewatered exhaust;
   a gas detector for detecting an amount of crossover cathode gas in the dewatered exhaust from the collection cell; and
   a sparger for bubbling additional inert gas into the condensed liquid collected in the collection cell.

2. The system of claim 1, wherein the gas detector is one of a trace gas analyzer, a mass spectrometer and a gas chromatograph.

3. The system of claim 1, wherein the inert gas is nitrogen and the crossover cathode gas is oxygen.

4. The system of claim 1 further comprising a gas drying unit on the dewatered exhaust from the collection cell configured to further dry the exhaust prior to reaching the means for detecting.

5. The system of claim 1 further comprising a dissolved gas or conductivity meter in the collection cell configured to measure dissolved crossover cathode gas in the condensed liquid collected in the collection cell.

6. The system of claim 1 further comprising a control unit having preprogrammed baseline data relating an amount of crossover cathode gas to an amount of membrane degradation, the control unit configured to receive data from the gas detector and compare the data to the preprogrammed baseline data to determine membrane degradation.

7. The system of claim 1, wherein the gas detector comprises a plurality of oxygen sensors, each oxygen sensor located on a respective anode of a fuel cell within the fuel cell stack to detect an amount of crossover cathode gas in exhaust from the respective anode.

8. The system of claim 7, further comprising a control unit having preprogrammed baseline data relating an amount of crossover cathode gas to an amount of membrane degradation, the control unit configured to receive data from each of the oxygen detectors and to compare the data to the preprogrammed baseline data to determine membrane degradation.

* * * * *